United States Patent [19]

Hanke et al.

[11] Patent Number: 5,555,134
[45] Date of Patent: Sep. 10, 1996

[54] REFRACTIVE LENS CRADLE

[75] Inventors: Deitmar Hanke, Mission Viejo; David A. Hull, Manhattan Beach, both of Calif.

[73] Assignee: Hughes Electronics, Los Angeles, Calif.

[21] Appl. No.: 395,408

[22] Filed: Feb. 27, 1995

[51] Int. Cl.⁶ .................................................. G02B 7/02
[52] U.S. Cl. ........................................ 359/819; 359/820
[58] Field of Search ..................................... 359/819, 820

[56] References Cited

U.S. PATENT DOCUMENTS

| | | | |
|---|---|---|---|
| 4,725,126 | 2/1988 | Siga et al. | 359/819 |
| 4,854,671 | 8/1989 | Hanke et al. | 359/820 |
| 4,909,599 | 3/1990 | Hanke et al. | 359/819 |
| 5,177,641 | 1/1993 | Kobayashi et al. | 359/820 |

FOREIGN PATENT DOCUMENTS

| 11811 | 1/1987 | Japan | 359/820 |
|---|---|---|---|
| 74003 | 4/1988 | Japan | 359/820 |

*Primary Examiner*—Loha Ben
*Attorney, Agent, or Firm*—Michael W. Sales; Wanda K. Denson-Low

[57] ABSTRACT

A refractive lens element (16) with a very thin edge thickness is mounted to withstand gun shock loads by utilizing a cell cradle (14) that is contoured to conform to the lens element surface profile (24). The lens is employed in a system having a rectangular clear aperture (26) which when projected on the circular lens defines four lens segments (36a–36d) outside of the clear aperture. The cell cradle has an opening (26) conforming to the clear aperture and carries a compliant padding (40) coextensive with the lens segments outside of the clear aperture to support the lens axially. The lens perimetrical edge (20) is bonded to the cell with a compliant bond material (44) to secure the lens in a radially symmetric position.

5 Claims, 1 Drawing Sheet

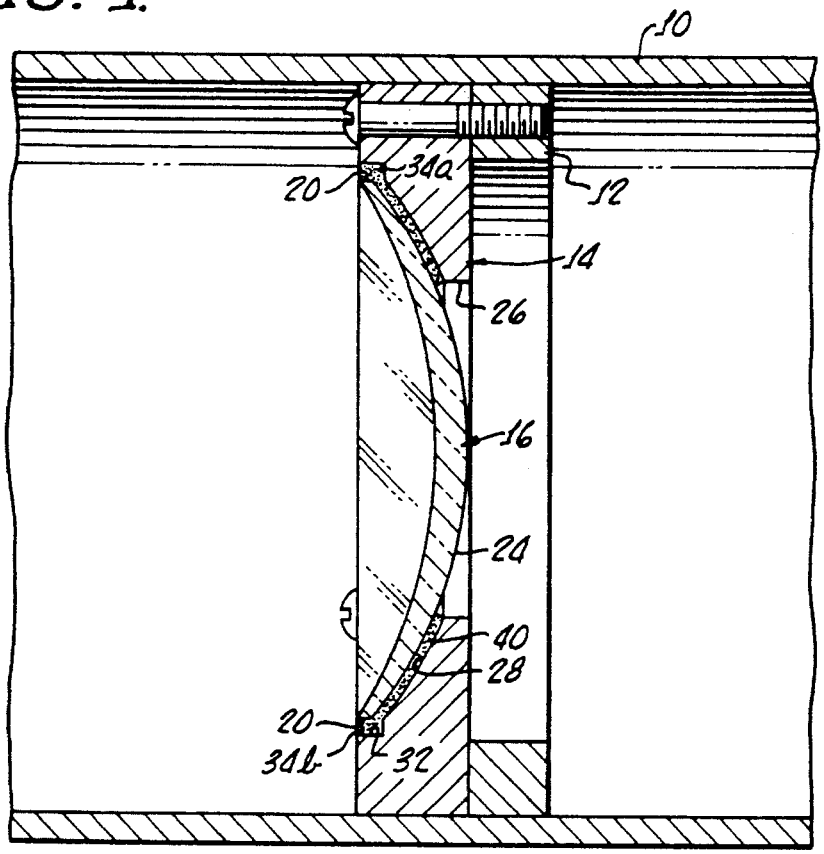

REFRACTIVE LENS CRADLE

BACKGROUND OF THE INVENTION

1. Field of the Invention

The present invention relates to mounting of a lens, and more particularly concerns mounting of a refractive lens element having a very thin edge thickness in a manner that enables the lens to withstand shock loads.

2. Description of Related Art

In the design of refractive optical systems there are often required lens elements whose edge thicknesses are exceedingly thin. Conventional mounting of such a lens element involves support of the element at its perimetrical edge. Commonly a shoulder or annular lens support cell is mounted in the optical system housing, and the lens edge is positioned against the support cell with a threaded ring being screwed into the housing to axially press against the lens edge and hold the lens in place in the housing. However, such a mounting is not sufficiently robust and will not allow the lens to withstand heavy shock loads, such as those that may be experienced by an optical gun sight system mounted on a gun turret, for example. Use of a bonding material at the lens edge will provide insufficient support because of the necessarily limited radial extent and rigidity of the usual bonding material and the thin cross-section adjacent to the bond. The bonding material, of course, cannot extend any significant distance along the surface of the lens as it may place unacceptable restraint on thermally induced expansion and contraction of the lens material. If the bonding material is sufficiently strong and rigid to support expected shock loads, the lens element may very well be subject to failure because of shocks and thermal loading on its thin cross-section. Generally for precise axial positioning the bonding material is relatively rigid, and when subject to thermal stresses because of temperature changes, may exert unacceptably large stresses on the lens itself. For these reasons, in the past, telescope or imaging system designs for a system that is to be subject to large shock loads have been changed and/or abandoned when the design is found to yield lens elements whose edge thicknesses are exceedingly thin.

Accordingly, it is an object of the present invention to provide for the mounting of a refractive lens element having a very thin edge thickness in such a manner that the lens element is capable of withstanding large shock loads while retaining its position, and thus alignment.

SUMMARY OF THE INVENTION

The present invention takes advantage of the fact that in some systems the clear aperture used is not circularly symmetric, or is smaller than the lens area. In such systems there will be large surface areas closer to the lens center that are not used optically. The clear aperture (also known as "footprint") of an optical system is the area of light that will effectively pass through the lens. The size and shape of the clear aperture is controlled by the overall optical system and its configuration and components. Effectively, the lens acts upon and receives only those light rays passing through this clear aperture.

In carrying out principles of the present invention a lens mount for use in an optical system having a clear aperture effectively smaller than the entire lens area includes a lens having a mounting surface and a perimetrical edge that encompasses an area greater than the area of the clear aperture, a cradle having a support surface configured to mate with at least portions of the lens mounting surface adjacent the perimetrical edge, and a cradle opening that substantially conforms with the clear aperture. The lens is mounted to the cradle with portions of the lens mounting surface extending along the cradle support surface radially outward from the cradle opening, and lens support padding is interposed between the cradle support surface and portions of the lens mounting surface. In a particular example, where the clear aperture is rectangular and the lens of circular configuration, a plurality of chords collinear with sides of the clear aperture delineate circular segments of the lens and compliant padding is interposed between these segments of the lens and the support cradle to provide axial support for the lens. In addition, a compliant bond material is bonded to the cradle and to the perimetrical lens edge to position the lens radially.

A method of mounting a refractive lens element embodying principles of the present invention includes the steps of providing a lens cell having a rectangular opening conforming to a clear aperture of a system in which the lens is used, axially supporting the lens from the lens cradle over the area of a plurality of portions of the lens extending radially outward of the cradle opening and radially supporting the lens from the lens cell at the edge of the lens.

BRIEF DESCRIPTION OF THE DRAWINGS

In the accompanying drawings:

FIG. 1 illustrates a fragment of an instrument housing embodying a lens support and lens that incorporates principles of the present invention;

FIG. 2 is a front view of the lens and lens mounting cell of FIG. 1; and

FIG. 3 is a rear view of the lens and lens mounting cell of FIG. 1.

DESCRIPTION OF THE PREFERRED EMBODIMENTS

As illustrated in FIG. 1, a housing section 10, which may form a portion of a typical optical system, such as, for example, an eye piece section of a gun sight telescope to be mounted on a gun turret, includes a fixed mounting ring 12 to which is securely fastened a generally circular lens cradle 14 that mounts a refractive lens 16 forming one element of an optical system, such as an eyepiece element of a gun sight, for example.

The particular optical system in which the lens is mounted presents a clear aperture (a "footprint") that is not circularly symmetric. For example, as shown in FIGS. 2 and 3, lens 16 is circular, having a perimetrical edge 20 and contoured surface 24 (FIG. 1) that may be termed a support surface for the purposes of this discussion. The cradle comprises an annular ring of a metal, such as aluminum, having a cross section of very broadly trapezoidal configuration, as shown in FIG. 1 and having a rectangular through opening 26 that is centrally and symmetrically positioned with respect to the circular cradle 14. The cradle includes a support surface 28 that is generally congruent with the curved configuration of the lens support surface 24 (FIG. 1) and has a radially inwardly facing circular shoulder 32 that is spaced radially outwardly of the circular perimetrical edge 20 of the lens. The opening 26 of the lens cell 14 is congruent with the clear aperture of the optical system in which the lens and its mount are employed.

Accordingly, as can be seen in FIGS. 2 and 3, the clear aperture, which in this case is a rectangle, includes linear sides 26a,26b,26c, and 26d that are collinear with chords of the circular lens. These rectangle sides (lens chords), together with the perimetrical edge 20 of the lens, define circular segments 36a,36b,36c, and 36d extending along areas of the lens and areas of the support cradle that are outside of the rectangular opening of the cradle. The cradle rectangular opening has a diagonal dimension that is substantially equal to the diameter of the lens, and, in any event, not greater than the lens diameter. Because the circular segments of the lens 36a–36d are not used in the optics of the system to pass light, they are available for lens mounting. To this end a compliant padding 40 (FIG. 1) is bonded to the curved surface 28 of lens cradle 14 covering most of but only the segment areas 36a–36d. The padding may cover all of the segment areas but is most effective at those portions of the segments that are further from the very thin perimetrical edge of the lens, e.g., close to the sides of the cradle opening. Effectively, the padding is formed in four separate segments, each congruent with a respective one of segments 36a–36d. The compliant padding 40 is not bonded to the lens surface 24, and, accordingly, the latter is free of radial restraint by this padding. The padding supports the lens against axial loads over a relatively large surface area. The padding itself need not be radially symmetrical.

Between the perimetrical edge 20 of the lens and the radially inwardly facing continuous shoulder 32 of the lens cradle are mounted a plurality of circumferentially extending and mutually circumferentially and evenly spaced sections of a bonding material 34a,34b,34c which preferably is relatively compliant. Although three uniformly spaced bonding material sections are presently preferred, these sections may be more than three in number, of different circumferential extent, or even continuous as long as these sections are symmetric about the perimeter (as shown in the figures). The bonding material, which is bonded to both lens and cradle, provides a perimeter bond between the lens edge and cradle. It may be compliant because it is not required to sustain axial shock loads, but rather serves solely to maintain the lens radial position. Preferably the padding is formed of a material such as a rubber and cork composition, as specified in military specification MIL-T-6841, having a total uncompressed thickness of 0.032 inches. A suitable compliant bonding material is a material meeting military specification MIL-S-8802, CL82. A reagent grade acetone may be used when applying the bonding material. Preferably the curvature of the cradle surface 28 is the same as the curvature of the lens support surface 24. However, because of the compliance of the padding material, this curvature of the lens cradle need not be precise, and requires neither the precision nor tolerance of the lens surface.

It will be seen that the described lens mount system provides a firm support of a thin edge refractive lens element over a large portion of its area and not just at its edge, but does not otherwise adversely affect optical performance where the system clear aperture encompasses an area less than the entire area of the lens. A system design, therefore, may still employ a very thin edge refractive element even for use in an arrangement subject to gun shock loads. Yet a secure firm mounting and positioning of the lens is accomplished. The resilient padding absorbs the large axially directed gun shock loads, as may be caused by gun recoil, for example, but, being free of bonding to the lens itself, does not radially restrain relative shifting of portions of the lens with respect to the cradle in a radial direction, as may be experienced during thermal variations. Thus, even though supporting the lens over a large area, the padding allows differential radial expansion and contraction of the lens and cradle. The compliant bonding 34a,34b,34c contacts the lens only at the perimetrical edge of the lens, and, of course, is also bonded to the cradle 14, specifically at its shoulder 32. Axial gun shock loads on the lens are shared between the bonding material and the padding. Any lens distortion which may result from the padding arrangement should be transitory in nature and not affect the lens position and thus its optical alignment. The bonding material positions the lens radially and is relatively compliant to allow for thermally induced radial shifting.

What is claimed is:

1. A lens assembly comprising:

a cradle;

a lens mounted to said cradle and having a lens edge;

padding positioned between outer portions of said lens and said cradle for axially positioning said lens relative to said cradle, said lens being free of radial restraint by said padding; and bond material positioned between and bonded to said lens edge and said cradle for radially positioning said lens relative to said cradle.

2. The lens assembly of claim 1 wherein said lens is circular and said outer portions of said lens define a plurality of segments of said lens.

3. The lens assembly of claim 2 wherein said segments include chords defining a rectangle, and wherein said lens assembly is configured for use in a system having a clear aperture congruent with said rectangle.

4. A method of mounting a lens element in an optical system, the system having an aperture of an area less than the area of said lens, said method comprising the steps of:

providing a cradle for said lens;

mounting said lens to said cradle;

positioning padding between said lens and said cradle for axially positioning said lens relative to said cradle; and positioning bonding material between said lens and said cradle for bonding said lens to said cradle and for radially positioning said lens relative to said cradle.

5. An optical system comprising:

a housing section having an aperture, said aperture having an aperture area;

a cradle;

a lens element having a lens area greater than the aperture area and being mounted to said cradle;

padding positioned between said lens and said cradle for axially positioning said lens relative to said cradle; and bond material positioned between said lens and said cradle for bonding said lens to said cradle and for radially positioning said lens relative to said cradle.

* * * * *